April 7, 1936. L. A. HOUSE 2,036,808
LUBRICATOR
Filed Nov. 23, 1933 2 Sheets-Sheet 1
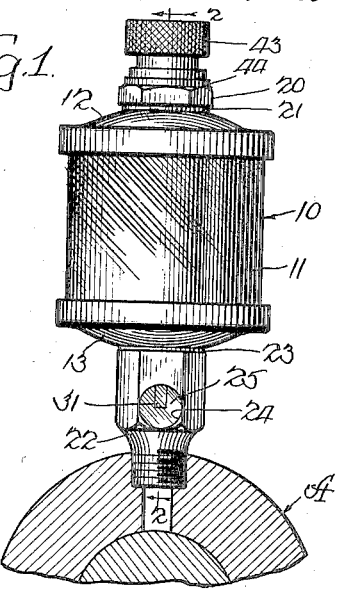
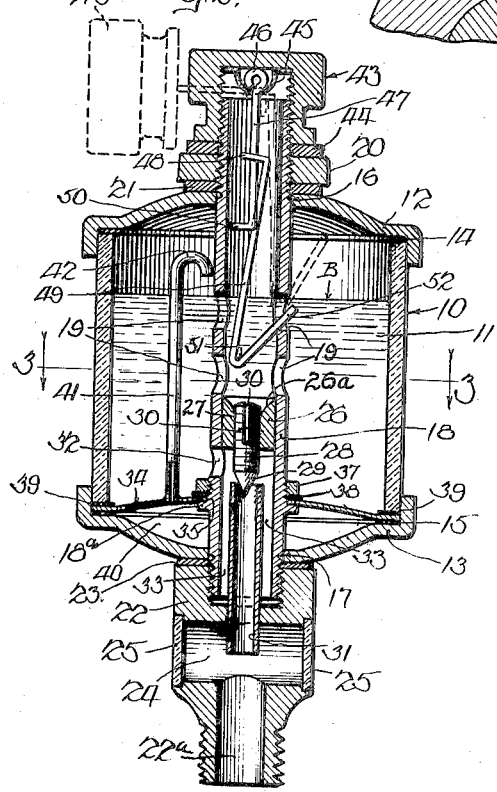
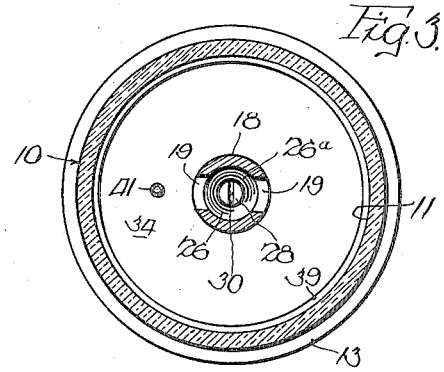
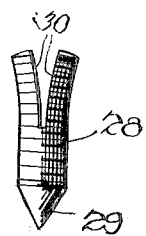
Inventor:
Lloyd A. House:

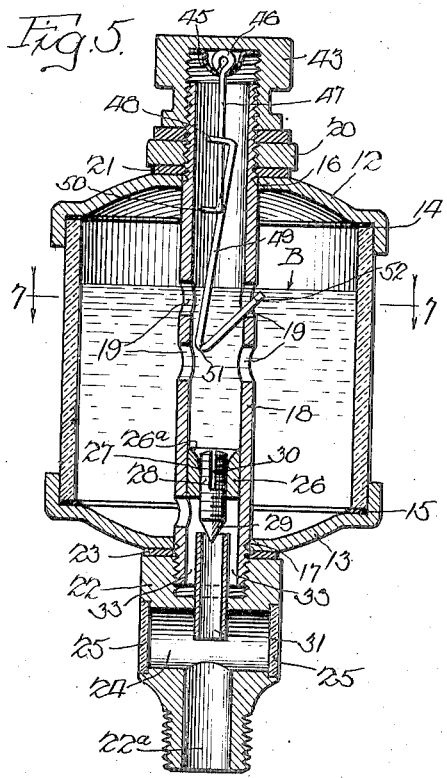
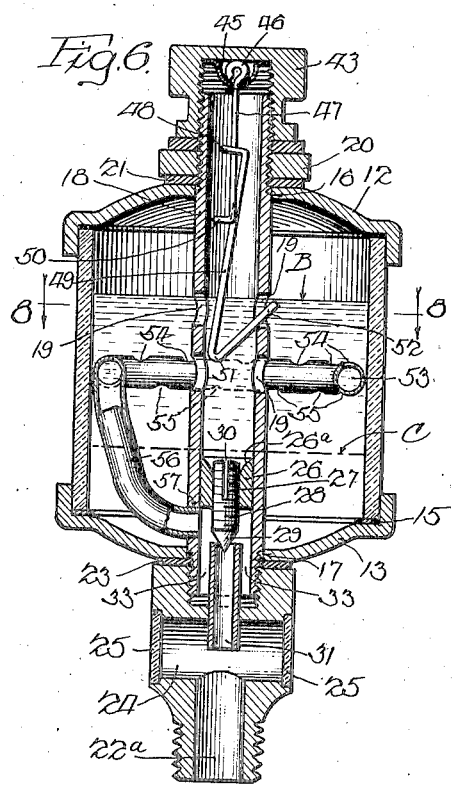
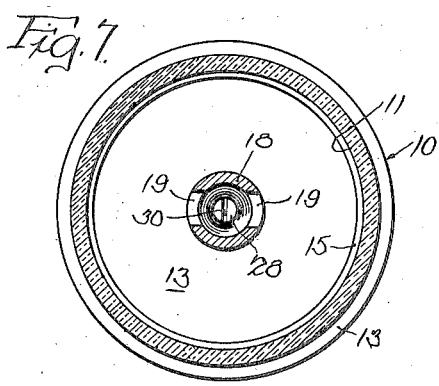
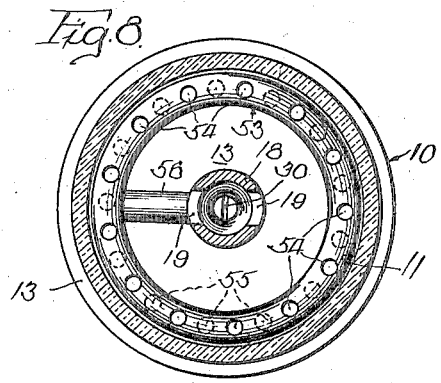

Patented Apr. 7, 1936

2,036,808

UNITED STATES PATENT OFFICE 2,036,808

LUBRICATOR

Lloyd A. House, Chicago, Ill., assignor to Victor Lubricator Company, Chicago, Ill., a corporation of Illinois Application November 23, 1933, Serial No. 699,337

7 Claims. (Cl. 184—55)

This invention relates to improvements in lubricators adapted for use with the stationary or revolving type of bearings.

The chief objects of the invention are the provision of lubricators having a reservoir and provided with mechanism therein which causes the automatic functioning of the lubricators through the expansion force of air against a body of lubricant to automatically feed the same to the bearing as the latter is heated and to cut off the supply thereto incident to proper lubrication.

Another object is the provision of a lubricator having mechanism which may be adjustably set with respect to the type of bearing to which it is attached for regulating the amount of flow of lubricant thereto and having means whereby the adjustment of the flow is visible outwardly of the device and the adjusting means being within the device to prevent unauthorized tampering therewith.

Still another object is the provision of a lubricator having mechanism therein whereby the force of air is broken permitting atmospheric pressure to the body of the lubricant during the time said mechanism is being regulated which will permit a constant flow of lubricant to the bearing that is visible to the operator.

A still further object is the provision of a lubricator provided with mechanism which may be adjusted to suit particular conditions of various types of bearings to properly lubricate the same controlled automatically by the degree of heat produced by said bearings.

In the accompanying drawings:—

Figure 1 is a side elevation of a lubricator of my design shown as attached to a bearing.

Figure 2 is a medial longitudinal sectional view taken on the line 2—2 of Fig. 1.

Figure 3 is a horizontal sectional view taken on the line 3—3 of Fig. 2.

Figure 4 is an enlarged detail side elevation of the valve adjusting screw.

Figure 5 is a medial longitudinal sectional view similar to Fig. 2 wherein the airtight heat retaining reservoir is omitted.

Figure 6 is a longitudinal sectional view similar to Fig. 5 wherein a lubricant conductor is shown.

Figure 7 is a cross sectional view taken on the line 7—7 of Fig. 5.

Figure 8 is a cross sectional view taken on line 8—8 of Fig. 6.

Referring to the accompanying drawings, the numeral 10 designates the lubricator as a whole which is shown as attached to a bearing A. The device consists of a tubular glass portion 11 forming a reservoir and having cup-shaped enclosure caps 12 and 13 respectively at each end thereof, each being provided with an annular flange which extends around the outer edges of each end of the tubular glass portion. Gaskets 14 and 15 respectively are positioned between the caps 12 and 13 and the body 11. The caps 12 and 13 are each provided wth an opening 16 and 17 therein through which extends a filler tube 18 provided with threads at each end thereof. The tube 18 is provided with a plurality of transverse openings 19 positioned intermediate its length which determines the level to which the device may be filled. The liquid passes through the openings 19 into the reservoir formed by the tubular glass portion 11 and the caps 12 and 13 and as the liquid attains a height to cover the openings 19, the air in the reservoir becomes trapped between the liquid level and the cap 12 and prevents a higher rise of the liquid in the reservoir. The threaded portion at the upper end of the filler tube 18 receives a nut 20 which clamps a gasket 21 against the cap 12 and the lower threaded end of the tube 18 receives a nipple 22 which clamps a gasket 23 against the cap 13. The nipple 22 is provided with a transverse bore 24 having pressed or otherwise secured therein mica or other transparent non-breakable material 25 providing visibility for the adjustment of the mechanism to be hereinafter described.

A bushing 26 is fixedly secured within the tube 18 below the openings 19 and is provided with a threaded central bore 27 to receive a screw 28 having a conical end 29 and a relatively long slot opening 30 at its other end to be engaged by a screw driver for adjusting the screw in the bushing. The bushing 26 is counter-sunk at 26a to facilitate the positioning of a screw driver into the slot opening 30 of the screw 28 for adjusting same. This screw 28 extends an appreciable distance outwardly of the bushing 26 with its conical end 29 extending into an upwardly extending tubular member 31 fixed in the nipple 22 and which has its other end extending therethrough into the transverse bore 24. The tubular member 31 is relatively long permitting the same to be easily adjusted with respect to the screw 28 by means of forcing the conical end 29 thereof into the tube to spring the same in forced fixed position with respect to said screw.

The filler tube 18 is provided with an opening 32 adjacent the lower end of the bushing 26 and provides a passageway for a lubricant in the reservoir formed by the glass body 11 into the lower portion of the tube 18 below the bushing 26 and around the tubular member 31. The member 31 is relatively small in diameter and provides an opening or space 33 longitudinally thereof between its outer surface and the inner surface of the filler tube 18.

A slightly convex disc 34 is positioned adjacent the cap 13 with the tube 18 extending through an opening 35 therein. The central portion of the disc 34 rests on an annular flange 18a of the tube 18 and is clamped thereto by means of a nut 37 and a gasket 38.

A gasket 39 is interposed between the disc 34 and the glass body 11 to seal the same to prevent leakage of the lubricant. The disc 34 is clamped in fixed position between the gaskets 15 and 39 by means of the cap 13 and nipple 22 forming a false bottom above the cap and an air chamber 40 therebetween.

A relatively small tube 41 is fixed to and extends vertically from the disc 34 and is provided with a downwardly turned portion or elbow 42 at its free upper end. This tube 41 is soldered to form an airtight joint with the disc 34 and extends through and above the lubricant level as indicated at B connecting the air chamber 40 with an air chamber formed between the liquid level B and the cap 12.

A threaded filler cap 43 preferably knurled to form a finger grip, is threaded to the upper end of the filler tube 18 against a gasket 44 to securely seal the opening in said tube through which the reservoir 11 is filled. The cap 43 is provided with a cup-shaped disc 45 formed to receive the end 46 of a wire-like link 47 extending through an eyelet 48 of a link 49. The link 47 is provided with an eyelet 50 while the link 49 is provided with a V-shaped bend 51 forming a leg 52 extending through one of the openings 19 in the tube 18. As the cap 43 is unthreaded and removed for either filling the reservoir or adjusting the set screw 28 forming a valve to regulate the flow of lubricant, the cap is held in suspended position by means of the sliding action of the links 47 and 49, and suspended by means of the leg 52 engaging an opening 19 in the tube 18.

As thus far described, assuming that the filler cap 43 has been removed and held suspended as indicated by dotted lines in Fig. 2, the lubricant is poured into the device through the filler tube 18 and passes through the openings 19 therein into the reservoir until a level of the lubricant to the upper-most openings 19 is attained. The lubricant also flows through the opening 32 into the chamber 33 around the tube 31 and around the screw valve 28, and when thus filled, the cap 43 is then threaded to the tube 18 against the gasket 44 sealing the device. It is apparent that with the opening of the filler tube so sealed, a flow of the lubricant through the outlet tube 31 is impossible due to the trapped air above the liquid line B. As the air is trapped as above described, then the liquid tends to flow outwardly of the reservoir through the tube 31 and this action creates a suction in the air chamber above the liquid level B and retains the liquid within the reservoir. As the bearing A is increasingly heated, the nipple 22 will become heated and conduct heat into the air chamber 40 forming a pressure therein which is exhausted through the vertical tube 41 into the chamber or air space above the lubricant level B and distributing an even pressure over the liquid body causing the same to be forced downwardly through the opening 32 around the valve 28 and through the tube 31 and the nipple 22 through a vertical bore 22a therein into the working portion of the bearing. This flow of lubricant to the bearing A will gradually relieve the frictional resistance thereto and decrease the heat therein and likewise decrease the heat in the chamber 40 which in turn will decrease the pressure of the expansion of air over the liquid level B and gradually reduce the flow through the tube 31. The cooling action of the device causes the air therein to contract and will draw in additional air through the opening 22a to displace the amount of lubricant discharged.

This operation is repeated from time to time depending entirely upon the condition of the bearing A. The flow of lubricant may be seen by sighting through the transparent openings 25 and the device may be regulated to suit various conditions of lubrication of different types of bearings, and when properly regulated, the screw 28 and tube 31 form a valve which will remain in fixed adjusted position.

The screw 28 is provided with a relatively long slot opening forming two walls on each side thereof which are flared outwardly in opposed directions. As the screw 28 is threaded into the bushing 26 the flared side portions contact the inner walls of the bushing and exert a frictional tension thereon for retaining the screw in fixed adjusted position.

Referring to Fig. 5, a similar construction is shown wherein the disc 34 and tube 41 have been omitted and the device depends entirely upon the heat transferred from the bearing through the entire body thereof for expanding the trapped air above the lubricant level B and a lighter pressure on the fluid is attained which is desirable in some types of bearing. The valve screw 28 is adjusted through the filler tube 18 in the same manner as above described.

Referring now to Fig. 6, I show a lubricator similar to that shown in Fig. 5 wherein an annular tubular member 53 is positioned intermediate the caps 12 and 13 and adjacent the inner walls of the glass body 11. This tubular member 53 is provided with a plurality of perforations 54 in the top surface thereof and a plurality of perforations 55 intermediate the top perforations in the lower surface of the tube. A tube 56 extends from the annular tube 53 to an opening 57 in the tube 18 and is fixed therein to support said tube 53 and to conduct the lubricant to the valve screw 28.

This type of lubricator is more particularly for use with a revolving type of bearing and especially of the high speed type where a relatively constant supply of lubricant is required for the normal operation of the bearing. The pressure is produced above the lubricant line B in the same manner as described in Fig. 5, and in addition the tube 53 is constantly submerged in the lubricant which will enter through the openings 54 and 55 and be conducted through the tube 56 in the quantity desired according to the adjustment of the valve 28.

In a high speed revolving bearing, the centrifugal force will cause the liquid to be thrown against the cap 12 displacing the air chamber adjacent said cap to the lower portion of the reservoir adjacent the cap 13 as indicated at C. The expansion of air in the air chamber and the expansion of the liquid as the device becomes heated will cause the liquid to be forced through the openings 54 and 55 and through the tube 56 with additional pressure.

The device as disclosed in the accompanying drawings embodies generally a reservoir chamber and a filler tube having an adjustable valve therein and an air chamber to which the heat is transferred, producing a pressure therein for permitting of an automatic functioning of the device.

In the above description of Figs. 5 and 6, the body portion of the lubricator is similar to that described in Fig. 2, and it is thought that a description of one will suffice for a description of all as like numerals have been added to like parts throughout the drawings.

I contemplate as being included in these improvements all such changes, variations and departures from what is thus specifically illustrated and described as fall within the scope of the appended claims.

I claim:—

1. A sight feed lubricator comprising a reservoir, a filler tube having openings therein at various levels and being disposed axially of the reservoir with the uppermost openings determining the lubricant level providing an air chamber thereabove, a cap closing one end of the tube, an adjustable valve within the filler tube arranged to control the lubricant flow through the lowermost opening in said tube, whereby under the action of heat the air in the air chamber and the lubricant will be expanded and forced through the opening and the valve in said tube and outwardly thereof, and under action of cooling the air in the air chamber will create a vacuum and the flow therefrom will be cut off, said valve being constructed to exert an outward pressure while in position in said tube for retaining the same in fixed adjusted position.

2. A sight feed lubricator comprising a reservoir, a filler tube having openings at various levels therein and being disposed axially of the reservoir with the uppermost opening thereof determining the lubricant level, a cap closing one end of the tube, an adjustable valve within the tube regulating the flow of lubricant through the lowermost opening thereof and outwardly of the reservoir, a nipple fixed to the lower end of the tube, means comprising a transverse bore in said nipple and pressed-in disc-like transparent material at each end of the bore through which the flow of lubricant can be observed while regulating said adjustable valve, and means on the valve exerting a frictional tension to its turning movements for retaining the same in adjusted position.

3. A sight feed lubricator comprising a reservoir, an apertured tube extending therethrough and having a cap closing one end and a nipple having a transverse bore therein at its other end, a valve in said tube, a feed member associated with said valve and reservoir regulating the flow of lubricant through the feed tube and said nipple, and pressed-in disc-like transparent material at each end of the bore in said nipple providing visibility of the flowing lubricant, said valve being arranged and constructed to be yieldingly held in adjusted positions in the tube.

4. A sight feed lubricator comprising a reservoir, an apertured tube extending therein, a bushing secured in the tube, an adjustable valve in the bushing of said tube, a relatively long feed member communicating with and adjustable by said valve for alignment therewith, and lock means on the valve coacting with the bushing for releasably securing said valve in adjusted position in the tube.

5. A sight feed lubricating device of the character described, comprising a chamber forming a lubricant reservoir, a valve for controlling the flow of the lubricant to the part to be lubricated, means including an air chamber in the reservoir producing a pressure on said lubricant in accordance with the temperature of the bearing for controlling the amount of flow, said valve being adjustably positioned for controlling the maximum amount of flow, and means on the valve for retaining the same in adjusted positions.

6. A sight feed lubricator comprising a reservoir for a lubricant, a filler tube provided with openings therein defining the level of the lubricant when the device is filled and providing an air chamber at one end of the reservoir, a cap closing one end of the filler tube, a bushing forming a reduced opening in the tube, a valve within the tube, the tube having an opening therein permitting the lubricant to flow therethrough around said valve, a false bottom in the reservoir forming an auxiliary air chamber therein, a tube extending through the lubricant from said auxiliary air chamber in the reservoir to the air chamber above the lubricant, whereby under the action of expanded heated air in the auxiliary chamber lubricant will be forced to flow through said valve.

7. A sight feed lubricator comprising a reservoir having an oil feed structure including an adjustable valve submerged in the lubricant and accessible from the top thereof, a nipple secured to the lower end of the lubricator and being provided with a transversely extending bore having an annular seat at each end thereof, a tubular member fixed in said nipple and extending into the oil feed structure, said valve coacting with the tubular member for regulating the flow of lubricant outwardly of the reservoir, disc-like transparent material pressed in said annular seats sealing the transversely extending bore and providing visibility of the lower end of the tubular member extending therein through which the lubricant flows.

LLOYD A. HOUSE.